(12) United States Patent
Nguyen (10) Patent No.: US 10,657,751 B2
(45) Date of Patent: May 19, 2020

(54) FACILITATING TRANSFER OF CASH INVENTORIES BETWEEN ENTITIES

(71) Applicant: Giesecke+Devrient Currency Technology America, Inc., Dulles, VA (US)

(72) Inventor: Keith Nguyen, Brampton (CA)

(73) Assignee: Giesecke+Devrient Currency Technology America, Inc., Dulles, VA (US)

( * ) Notice: Subject to any disclaimer, the term of this patent is extended or adjusted under 35 U.S.C. 154(b) by 0 days.

(21) Appl. No.: 15/749,955

(22) PCT Filed: May 25, 2016

(86) PCT No.: PCT/US2016/034113
§ 371 (c)(1),
(2) Date: Feb. 2, 2018

(87) PCT Pub. No.: WO2017/023400
PCT Pub. Date: Feb. 9, 2017

(65) Prior Publication Data
US 2018/0218555 A1    Aug. 2, 2018

Related U.S. Application Data

(60) Provisional application No. 62/201,562, filed on Aug. 5, 2015.

(51) Int. Cl.
*G07D 7/181* (2016.01)
*G06Q 40/02* (2012.01)
(Continued)

(52) U.S. Cl.
CPC ........... *G07D 7/181* (2017.05); *G06Q 10/087* (2013.01); *G06Q 30/02* (2013.01); *G06Q 40/02* (2013.01); *G07D 7/003* (2017.05)

(58) Field of Classification Search
CPC ........ G07D 7/181; G07D 7/003; G06Q 40/02; G06Q 10/087; G06Q 30/02
See application file for complete search history.

(56) References Cited

U.S. PATENT DOCUMENTS 7,340,415 B1    3/2008    Gasper et al.
7,946,474 B1    5/2011    Agrawal
(Continued)

FOREIGN PATENT DOCUMENTS

WO    2013/067042 A2    5/2013

OTHER PUBLICATIONS

Korean Intellectual Property Office (ISA), International Search Report and Written Opinion for International Application No. PCT/US2016/034113, dated Aug. 19, 2016.
(Continued)

*Primary Examiner* — Sonji N Johnson
(74) *Attorney, Agent, or Firm* — Faegre Drinker Biddle & Reath LLP (57) ABSTRACT

A method and system performing the method includes receiving currency inventory information from a plurality of cash-points. The method also includes receiving a currency shipment request from a first cash-point. The method further includes determining a set of eligible cash-points from the plurality of cash-points based on the currency inventory information, each eligible cash-point being associated with a respective currency inventory having sufficient currency reserves to fulfill the currency shipment request. The method still further includes receiving an offer from each eligible cash-point, each offer indicative of an asking price for fulfilling the currency shipment request. The method additionally includes determining a selected cash-point to fulfill the currency shipment request based on the offers. The
(Continued)

method even further includes initiating shipment of currency from the selected cash-point to the first cash-point.

12 Claims, 4 Drawing Sheets

(51) Int. Cl.
    *G06Q 30/02*     (2012.01)
    *G06Q 10/08*     (2012.01)
    *G07D 7/00*     (2016.01)

(56) References Cited

U.S. PATENT DOCUMENTS

| | | |
|---|---|---|
| 8,527,336 B2 | 9/2013 | Kothari et al. |
| 9,058,598 B1 | 6/2015 | Li et al. |
| 2004/0030622 A1 | 2/2004 | Ramos et al. |
| 2006/0235739 A1 | 10/2006 | Levis et al. |
| 2006/0282277 A1 | 12/2006 | Ng |
| 2007/0174156 A1 | 7/2007 | Emde et al. |
| 2007/0179874 A1 | 8/2007 | Spirgel et al. |
| 2007/0192244 A1 | 8/2007 | Drummond et al. |
| 2008/0314981 A1 | 12/2008 | Eisenson |
| 2009/0319429 A1 | 12/2009 | Scully |
| 2010/0131407 A1 | 5/2010 | Folk et al. |
| 2012/0066014 A1 | 3/2012 | Walker et al. |
| 2014/0201012 A1 | 7/2014 | Doran et al. |
| 2015/0071522 A1* | 3/2015 | Chae ..................... G07D 7/00 382/135 |
| 2015/0101906 A1 | 4/2015 | George et al. |
| 2015/0186992 A1 | 7/2015 | Blakeslee et al. |
| 2018/0218323 A1 | 8/2018 | Nguyen |

OTHER PUBLICATIONS

European Patent Office, Extended European Search Report in EP Patent Application No. 16833447.2, dated Nov. 23, 2018.
Korean Intellectual Property Office (ISA), International Search Report and Written Opinion for International Application No. PCT/US2016/034111, dated Aug. 30, 2016.
U.S. Patent and Trademark Office, Office Action for U.S. Appl. No. 15/749,050, dated Jan. 27, 2020.

* cited by examiner

FACILITATING TRANSFER OF CASH INVENTORIES BETWEEN ENTITIES

CROSS REFERENCE TO RELATED APPLICATIONS

This application is the National Stage of International Patent Application No. PCT/US2016/034113, filed May 25, 2016, and claims priority to U.S. Provisional Patent Application Ser. No. 62/201,562, filed Aug. 5, 2015, which is incorporated by reference herein in its entirety for all purposes.

TECHNICAL FIELD

The present disclosure relates generally to cash inventories, and more specifically to facilitating transfer of cash inventories between entities.

BACKGROUND

Business entities, from local mom and pop shops to national retailers and large banks, require cash to service day-to-day business operations. For example, a grocery store clerk requires assorted denominations of paper currency or banknotes and coins in order to make change for customers purchasing goods with cash. If the clerk is unable to make the requisite change for a customer, the customer may be unable to otherwise purchase the item and the sale will be lost. The inability to service transactions with cash may also reflect poorly on a business's reputation. Customers who deal in cash may stop visiting such stores altogether. Bank branches and ATM's require cash to service the most basic customer requests. An inability to process these transactions, even for a short period of time, could adversely affect operations, not only of the locations themselves but also the operations of any associated institutions. On the other hand, carrying too much paper currency on hand may present a security risk for certain retail locations, such as convenience stores or other locations lacking in security infrastructure. Having too much cash on hand at one location could also result in too little cash at other locations where there is higher demand.

Although credit cards and electronic transactions have become more popular, a large percentage of transactions are still carried out with paper currency and coins. Thus, maintaining sufficient cash on hand at retail locations is a vital component of any business that sells virtually any type of goods or services. However, as electronic transactions increase in popularity, avenues for accumulation of currency to service day to day operations are diminishing.

Technology in the field of currency processing systems has yielded advancements in currency counting, counterfeit detection, and fitness calculation, enabling most businesses to obtain devices that automatically count, sort, and account for cash inventories. Particular devices may be capable of connecting to a network and providing output to a software system.

In certain currency processing systems, deposited banknotes are analyzed for integrity and quality. If the system determines that banknotes or other currency objects cannot be read properly, are damaged, counterfeit, or otherwise unfit for continued circulation, the system will generally reject the banknote or currency object for a human to perform a second review of the note. These systems may track deposited notes by serial number or other identifier, and store information regarding accepted and rejected notes in a database. Thus, certain cash management systems may have invoicing and tracking functionality for monitoring deposited banknotes. These systems may be implemented at various cash centers within a financial institution.

The cash cycle describes what happens to currency from printing to destruction. Currency is created and distributed by Central Banks (and similar authorities), enters circulation, is used and reused many times, and eventually reaches a point where it is worn or soiled and must be replaced with a new note. This also is true for other currency objects such as Food Coupons, Casino Vouchers, Cash-Out Tickets and other types of currency objects used in commerce.

Currency (also known as banknotes) is dispensed, carried, spent, stored, exchanged and transported. Currency is transported in bulk from places of excess buildup, such as retailers, to more secure locations, such as Cash in Transport (CIT) facilities, bank vaults, and the like. Whenever notes are aggregated, they must be sorted and counted. In virtually all places where any reasonable volume must be counted, this is done with machines of varying levels of speed and sophistication.

In the past several decades, the use of machines to count, sort and validate currency has expanded significantly in terms of both quantity and breadth of functionality. Some machines are used to count, sort, authenticate, capture serial numbers, evaluate fitness and even destroy banknotes (where this is authorized) at speeds up to or exceeding 44 banknotes per second. Output from these devices can be used to monitor currency deposits at various cash-points within a financial institution.

SUMMARY OF INVENTION

According to aspects of the present disclosure, a method includes receiving currency inventory information from a plurality of cash-points. The method also includes receiving a currency shipment request from a first cash-point. The method further includes determining a set of eligible cash-points from the plurality of cash-points based on the currency inventory information, each eligible cash-point being associated with a respective currency inventory having sufficient currency reserves to fulfill the currency shipment request. The method still further includes receiving an offer from each eligible cash-point, each offer indicative of an asking price for fulfilling the currency shipment request. The method additionally includes determining a selected cash-point to fulfill the currency shipment request based on the offers. The method even further includes initiating shipment of currency from the selected cash-point to the first cash-point.

Other features and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION

Although many of the exemplary embodiments disclosed herein, as well as in these disclosures, are directed toward banking and accounting, the invention disclosed herein is not limited to applications in the field of banking and accounting, but rather is applicable to a wide range of applications in the financial services industry and beyond, including, but not limited to, retail banking, retail commerce, currency exchanges, law enforcement, central banking, clearing houses and processing of commercial paper, accounting, auditing, casino operations, gaming, transit agency operations, and many other fields.

Currency processing and inventory management techniques have evolved from simple deposit and withdrawal account balancing systems to sophisticated currency counting machines. Certain modern currency counting machines include functionality for processing banknotes and collecting detailed information regarding currency condition, denomination, serial number, location, and other currency attributes. The teachings of the present disclosure present a solution whereby retail chains, bank branches, ATM's and other businesses can use these machines to manage currency reserves and utilize those locations that are net currency receivers to make money by transferring that currency to nearby locations that require currency. For example, a retailer may install cash processing machines at certain retail locations. These machines may be equipped with specialized capabilities for currency counting and management, including deposit and withdrawal tracking, and inventory management capabilities. Information regarding type, quality, fitness, condition, denomination, and the like may be recorded and sent to a central market maker for matching entities with currency to nearby entities with a demand for currency.

For example, a convenience store may have an excess of cash on hand. The convenience store may wish to limit the available cash it carries day-to-day in order to reduce security risks posed by carrying large amounts of cash. Moreover, knowing there is a demand for such excess cash, the store may look to generate an additional revenue stream. Traditionally, the convenience store would have to transfer deposits to a bank to deposit the cash or, if affiliated with a larger chain or a central affiliate office, schedule delivery to a parent location for processing. A neighboring retail store may have a need for paper currency, but may have to negotiate currency transfer from a central affiliate office. The retail store may also have to withdraw deposits from a bank account and arrange for delivery of those funds. The teachings of the present disclosure present a solution whereby cash inventory exchanges are brokered by a central clearing house that inspects for quality and authenticity of the currency and sets a price for exchange. The clearing house may analyze offers from a variety of nearby locations and may select a lowest cost, or otherwise optimal, business location to transfer currency from. The central clearing house may additionally schedule secure shipment of the funds to/from each business location, or may contract out this transportation. Thus, locations that require a quick transfer of currency receive the desired cash in order to meet customer demand, while cash suppliers are rewarded with a premium for supplying the cash to neighboring facilities.

In certain embodiments, cash processing machines equipped with processors and network access perform counting, sorting, and verification of cash deliveries. For example, a retail location may process banknotes through such a device. The device may relay pertinent attributes of the processed cash to a central clearing house or broker. The broker may receive a request for cash and matches the request with several nearby cash inventories. The broker may solicit offers from the inventory holders and creates a market for fulfilling the cash request. The broker may additionally schedule transportation, and may automatically select the lowest cost cash seller to fulfill the cash request. A currency processing machine at the requesting location may verify the cash transfer before funds are dispersed to the cash seller.

In certain embodiments, cash inventory is managed across entities by supplying cash inventory information to a central process that manages and stores inventory information. This inventory information may be used to forecast expected cash supply and demand events and proactively schedule transfer of funds appropriately. For example, if a large holiday, such as black Friday, is coming up, the system may schedule delivery of cash reserves at popular retail chains. Thus, those entities that supply cash are compensated for providing cash while the retailers that require cash receive inexpensive access to cash automatically without coming close to a shortfall.

Cash processing machines may verify shipment or delivery of the proper currency order. For example, a cash processing machine at the recipient location processes delivered cash to verify the quality and amount of cash that has been delivered. The cash processing machine may transmit information regarding the processed cash to a central process that verifies shipment and processes payment for the delivery.

Cash processing machines may act as agents to verify cash quality, denomination, and amount, verify shipment details, and verify timeliness of arrival of cash shipments. These devices may report findings to a central process that controls a network of information regarding shipments and deliveries. The network may include a collection of information for each subscriber cash-point, or location. For example, if a particular cash-point fails to make timely deliveries as agreed to, the late deliveries may be noted and the subscriber cash-point may be eliminated from consideration for fulfilling future transaction requests.

It should be noted that the terms currency and banknote may be used interchangeably in the present disclosure. Currency comprises money in any form in actual use or circulation as a medium of exchange, including banknotes and coins. Cash-points, as used herein, may refer to, for example, a retail store, convenience store, restaurant, merchant, grocer, bank, branch, ATM, vault, cash register, payment terminal, or any other location where currency is stored or transacted. Subscribers may refer to entities or cash-points that participate in the cash delivery market either as purchasers or suppliers of currency.

Figure 1:
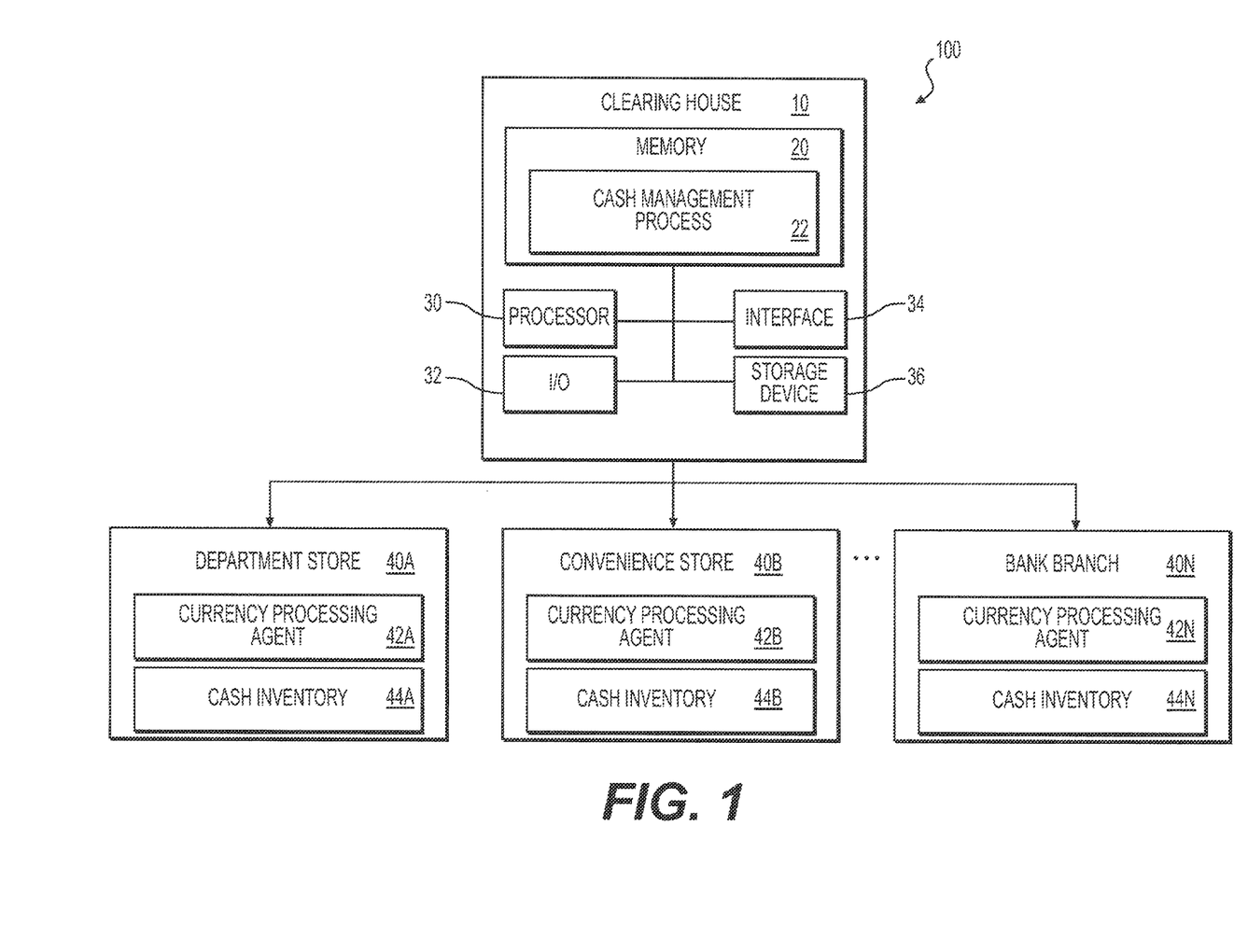
FIG. 1 illustrates a high level block diagram of a system for facilitating transfer of cash inventories between entities in accordance with a particular non-limiting embodiment of the present disclosure.

With reference to FIG. 1, a system 100 for facilitating transfer of cash inventories between entities is illustrated in accordance with a non-limiting embodiment of the present disclosure. System 100 includes clearing house 10, which includes a memory 20, processor 30, input/output 32, interface 34, and storage device 36. Storage device 36 can include any primary or secondary storage device including read-only memory, flash memory, magnetic computer storage devices (e.g., hard disks, floppy disks, and magnetic tape), optical discs, solid state disks, and the like. Processor 30 loads instructions into memory 20 and executes cash management process 22 to manage cash inventories at various entity locations, i.e., cash points, and create a market for transferring reserve currencies between cash-points. Currency processing agents 42*a-n* positioned at businesses 40*a-n*, i.e., department store 40*a*, convenience store 40*b*, and bank branch 40*n*, are connected to clearing house 10. Currency processing agents 42*a-n* process cash inventories 44*a-n* at each business and report currency inventory information to cash management process 22. Cash inventory 44*n* may include vault cash at a bank branch and may include reserve currency, or currency held against deposits at a bank, while cash inventory 44*a* may include petty cash or cash register cash that a department store sales representative can use to make change.

In certain embodiments, currency processing agents 42*a-c* include memory and processors that execute tasks including money counting and quality inspection tasks. These agents may process information and report to a central agency that acts as a broker to step between merchants and match buyers and sellers at the best price for both parties.

Cash inventories may also be tracked via manual processes, such as by tellers at a bank branch window or managers at a retail location. Software may function in connection with various devices to dispense and/or receive currency and manage currency inventory including currency quality and defect information, denomination information, circulation information, and information regarding the source of the currency (e.g., the depositor or the transferring institution). As another example, bank vaults may manually be inspected and employees may manually take inventory of cash reserves at each particular cash-point in an organization.

Retailers and banks may waste resources on inefficient delivery mechanisms in the currency management systems of today. Delivery operations are manually scheduled and little or incomplete analysis of logistical efficiencies is conducted, causing these businesses to waste resources on inefficient carriers. Further, little planning is conducted to prepare for anticipated or expected events. For example, an organization may anticipate a large demand for cash on Fridays before a holiday weekend. It may be advisable to start transferring currency to local cash-points in regions where expected demand is high at least 2 weeks in advance of such an event. However, conducting such preparations in anticipation of demand may be extremely difficult and require analysis of many factors, including lowest cost shipping routes between cash-points, and a determination of which cash-points have serviceable currency on hand. Further, waiting until a shortage of funds exists leaves managers with little choice in terms of fund transfer scheduling. For example, if more time is provided an analysis of long-term solutions may be conducted, including initiating a recurring shipment of currency. As another example, analysis of the most efficient cash-point for supplying reserves may be conducted. As still another example, an analysis of the quality of banknotes at various cash-points may be conducted, and, if required, a particular class of banknotes may be assembled and shipped.

Cash management process 22 creates a market for fulfilling currency requests by polling cash inventory data supplied by neighboring cash-points and soliciting bids from each cash-point with eligible cash reserves. For example, cash management process 22 reviews inventory data submitted by each cash-point. Some inventory information may be submitted by currency processing agents 42*a-n*. Other inventory information may be submitted directly by employees or managers of each cash-point location or by a central office associated with one or more merchants. One cash request may be a request for high quality banknotes in various denominations. Cash management process 22 reviews inventory information for various cash-points and finds eligible cash-points. Eligible cash-points are those cash-points that have registered as being able to or willing to supply other cash-points with currency. Eligible cash-points additionally have been determined to have sufficient inventory to fulfill the cash request.

Cash management process 22 may then determine a price for fulfilling the cash request. For example, a supplying cash-point offers to fulfill a cash request for $200. This can include preparation of the cash, transportation, security, insurance, and any additional costs. Offers may be solicited from any number of eligible cash points. In certain embodiments, cash-points pre-register with a default offer price.

The offer price may be shifted up or down based on supply and demand of cash, regional preferences, or the like. For example, a business could have trucks with excess cargo available running direct routes to various locations. Cash may be carried on the trucks at little cost to the business. Thus, there is an opportunity for the business to make a larger margin on transferring cash to particular locations. Accordingly, the business may be willing to reduce its bid price in order to secure a cash shipment contract.

As another example, a convenience store may sign up to regularly transfer its cash to a local department store that is only blocks away. However, it could be inconvenient for the convenience store to ship cash to locations that are further away. In certain embodiments, cash management process determines when it would be cost effective to arrange for third party shipment of cash for small businesses that do not ship frequently and do not have relationships with shippers. Thus, efficiencies in currency shipment can be realized by those who previously have not utilized these services before.

In certain embodiments, cash management process 22 arranges logistical details associated with the shipment. For example, cash management process 22 contracts with local secure carriers for fulfilling cash requests. As another example, cash management process 22 obtains insurance required for shipment of cash over certain amounts.

The teachings of the present disclosure additionally provide a system for banknote inventory processing and management using historical transaction information for forecasting currency demand and scheduling optimal placement of currency reserves. Transfer of currency reserves can be optimized to use the most efficient delivery route, the most cost effective carrier, or quickest delivery time, depending on the needs of the organization. Currency reserves may also be scheduled for transfer based on availability of serviceable banknotes. Scenario forecasting includes generating and displaying models to showcase currency delivery schedules in action against forecasted demand. The forecasted demand may be modified to assess the organization's preparedness for unexpected demand events. Additional scenarios could be planned for, such as unexpected natural disasters and other unexpected events, to more efficiently deposit reserves at cash-points.

The teachings of the present disclosure provide for cash-point operators and bank managers obtaining information regarding cash processing systems, as well as information regarding reserve banknotes and withdrawal information at each cash-point in their service area. These systems support the specific needs of cash centers with varying types of operation. For example, withdrawal rate and reserve information can be important for management of automated teller machines, while deposit, withdrawal, quality, and reserve information can be more important to track at the bank's branch level. Integrated inventory management systems provide a constant overview of the amounts of banknotes being processed at each cash-point in an organization.

In certain embodiments, this information can be collected and utilized at or near real-time to influence decision making processes within cash management processes. For example, a commercial bank concerned with accommodating demand requirements at local branches can coordinate and schedule transfer of banknotes between cash-points to meet this excess demand. As another example, a central bank concerned with decentralizing currency reserves and maintenance of liquidity and required reserve ratios at various banks can schedule the transfer and production of banknotes based on current cash processing and inventory information gathered by these systems.

Clearing house 10 may include a computer that accesses historical demand data. Clearing house 10 may be implemented in a variety of configurations without departing from the scope of the present disclosure. For example, cash management process 22 can be executed as a service provided by a public cloud provider and operated by a cash management provider, i.e., according to a software as a service model. The cash management provider often has expertise in forecasting currency demand and may have access to large amounts of historical demand data from various retailers, financial institutions, and central banks due to previous business engagements. However, due to the sensitive nature of the hosted data, some businesses may prefer to host this data within secure private environments, such as on a server operated at a central location within the bank's central or technical offices.

In certain embodiments, cash management process 22 retrieves historical demand data for a given time period from a database. As an example, cash management process 22 retrieves historical sample data sets for each cash-point in the Mid-Atlantic United States region (e.g., cash-points 40a-n) over a particular range of days to determine currency demand trends. Data may be compared year over year to spot anomalies and forecast demand spikes. Various other statistical analyses can be utilized to determine trends, spot demand anomalies, and forecast currency demand in the branches.

In one example, historical demand data is utilized to develop a baseline for a particular cash-point. The baseline is used to detect anomalies in cash inventory levels so that currency shortages are detected before becoming problematic. For example, if current currency inventory data deviates from the baseline reserve data, cash management process 22 may initiate a currency transfer so that reserve levels are maintained within the baseline thresholds established by the historical demand data.

Demand forecasts for newly added cash-points may additionally be forecasted even though no transaction data for the new cash-point has not been stored. For example, if a new retail location opens, historical data for other cash-points in the region can be utilized to forecast likely currency demand at the new location. Cash management process 22 may also determine aggregate demand for a region, and estimate that some demand may be offset by the opening of the new cash-point.

Cash management process 22 may generate a schedule for transferring currency between cash-points, such as between cash-points 40a-n. The schedule is generated based on historical demand data and current inventory conditions at each cash-point. In an example, cash management process 22 utilizes currency attribute data collected via note processing agents, such as currency processing agents 42a-n, to generate currency transfer manifests for assembly and fulfillment of the currency transfer schedule. These transfer manifests would direct employees at cash-points to assemble specific sets of currency for transferring. For example, denomination and quality requirements as well as pick-up time may be specified in the manifest and the employee may assemble the currency to meet the requirements. The resulting assembled set of currency can be retrieved and delivered to the specified cash-point.

Cash management process 22 creates the transfer and delivery schedule with an eye towards optimizing efficiency. For example, a shortest path algorithm would uncover a ranking of the closest cash-points with available currency reserves for transfer in order to build the delivery schedule. Further, lowest cost carriers could be determined. In emergency situations, immediate delivery by an employee may be recommended to meet a currency shortage crisis.

Currency quality data may be especially useful for those cash-points which require a particular caliber of currency for dispensing. Some cash-points use automated delivery mechanisms with low tolerances for variations in dispensed currency since no employee is present to oversee operation or attend to customer complaints. For example, ATM's require a high standard of currency termed ATM fit notes. This may be the highest standard and often requires banknotes of the highest quality. Thus, currency delivery to an ATM would be prepared with only banknotes that fit this quality standard. Certain currency processing agents 42a-n are capable of rendering determinations as to fitness levels of processed notes. Notes with common fitness level may be sorted and stored together. Currency attribute data can be configured to contain this information. In this example, when preparing a currency transfer schedule, cash management process 22 determines cash-points with suitable cash reserve inventory for meeting the demand requirements of the ATM.

In certain embodiments, cash management process 22 delivers notes form two separate cash-points in order to meet cash demand requirements. That is to say, cash management process assembles currency shipments from several cash-points to meet the needs of a certain cash-point and fill the cash request. For example, it may be difficult to find one single cash-point with excess reserves suitable to fulfill the demand requirements of an active ATM. Thus, notes may have to be transferred from several cash-points. Details regarding such a delivery are specified in the transfer and delivery schedule.

Cash management process 22 can be utilized to schedule recurring transfers of currency between cash-points. For example, if a first cash-point is determined to be a weekly net depositor and a second cash-point is determined to be a weekly net withdrawer, then a weekly transfer of banknotes between the cash-points may be scheduled. Discounts on shipping can be achieved by setting up a recurring transfer.

Figure 2:
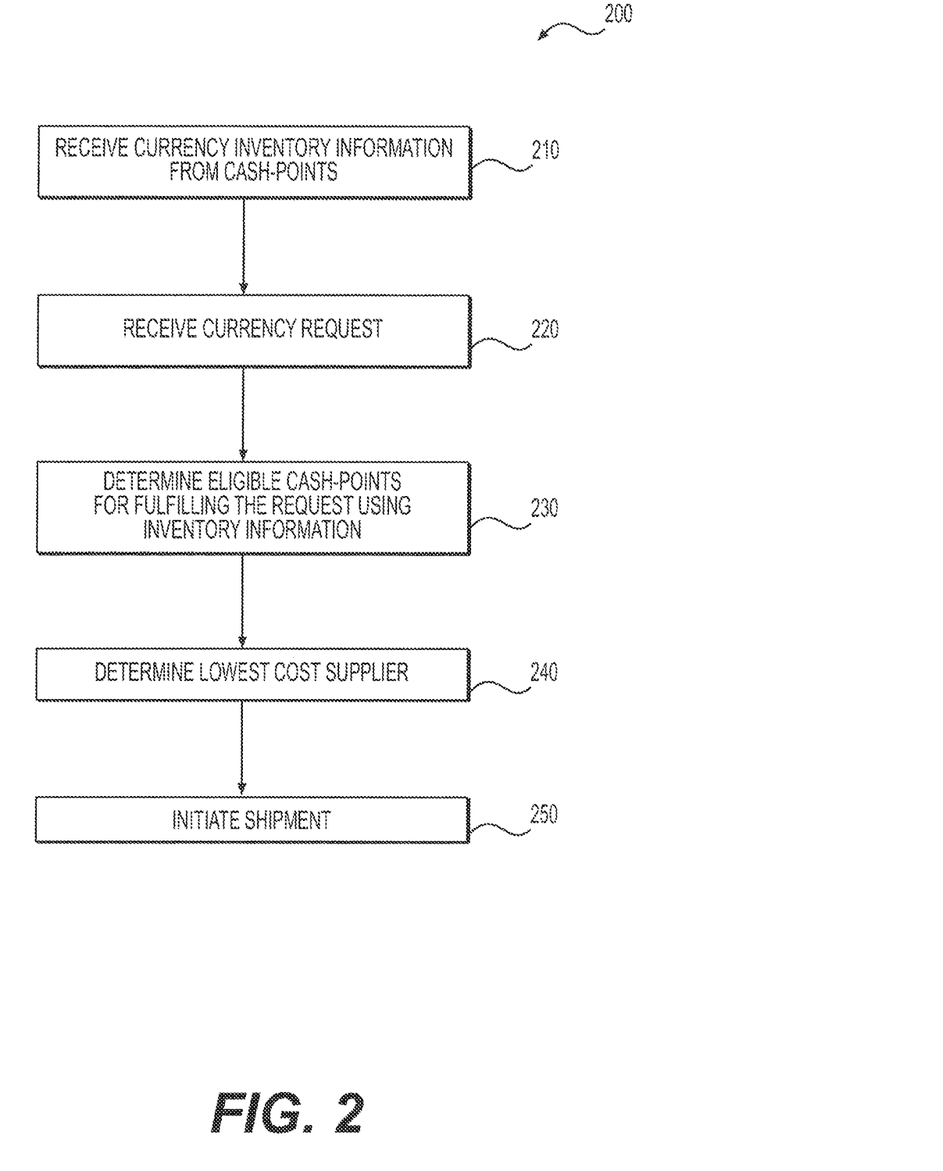
FIG. 2 illustrates a flow chart of a method for facilitating transfer of cash inventories between entities in accordance with a particular non-limiting embodiment of the present disclosure.

With reference to FIG. 2, a method 200 for facilitating transfer of cash inventories between entities is illustrated in accordance with a non-limiting embodiment of the present disclosure. At step 210, currency inventory information is received from cash-points associated with one or more business entities. For example, cash-points may include bank branches, ATM's, retail stores, merchants, auto-repair stores, grocers, and any other type of business that deals in paper currency and coins.

Currency inventory information can be received from specialized agents, or cash processing machines, running at each cash-point. In an example, a currency clearing house service installs cash processing machines at each cash-point. Businesses may purchase these machines or the machines may be provided in order to entice businesses to subscribe to a cash delivery network. Such a cash delivery network could include various cash-points acting as cash requestors or suppliers at various points. Subscription to the cash delivery network could also include making the cash-point eligible to submit offers for filling cash requests, and present the cash-point with an opportunity to make money on fulfilling cash requests.

The currency processing machines can be used to act as quality control and verification agents. For example, shipments may be verified and processed by the agents. The currency processing machines may also process all currency reserves for a cash-point to take stock of the business's current cash inventory levels. This information may be used in fulfilling requests for cash transfers from other business entities or other affiliated cash-points.

At step 220, a currency request is received. The currency request specifies, for example, an amount, denomination, or other attributes of a currency request. The currency request may be received from a currency processing agent, via a web interface for making such requests, or via any other interface with a central broker or clearing house for verifying currency transfers within the cash delivery network.

At step 230, eligible cash-points are determined that are able to fulfill the request. The currency inventory information for each cash-point in the network is polled. For example, regional cash-points may be polled first before cash-points within the state. Geographic search zones can be employed in limiting the amount of inventory polling that occurs. If only a few eligible cash-points are located within the geographic search area, the search area can be widened to supply the most options in the hopes of finding the most cost-effective supplier.

At step 240, a lowest-cost supplier is determined. Shipping prices and insurance could be factors in this determination. For example, some subscriber cash-points might not provide shipping while others do. Thus, the determination of the lowest-cost supplier can include determining whether shipping is included in the offer price for a given cash-point supplier and negotiating shipping and insurance rates if transportation is not included. Many other factors may weigh on the determination of the lowest-cost currency supplier.

Other factors may be optimized in selecting a supplier. For example, the closest supplier could be selected to fulfill a highly urgent cash request. The requestor could even provide the shipping mechanism to reduce time in fulfilling the request. The requestor can set priorities for consideration in selecting a cash supplier.

At step 250, the currency shipment is initiated, and the payment for the shipment is negotiated and processed. In certain embodiments, the shipment is verified before payment is processed. Payment for the shipment may be processed via electronic means, such as by a credit card account on file with the clearing house.

Figure 3:
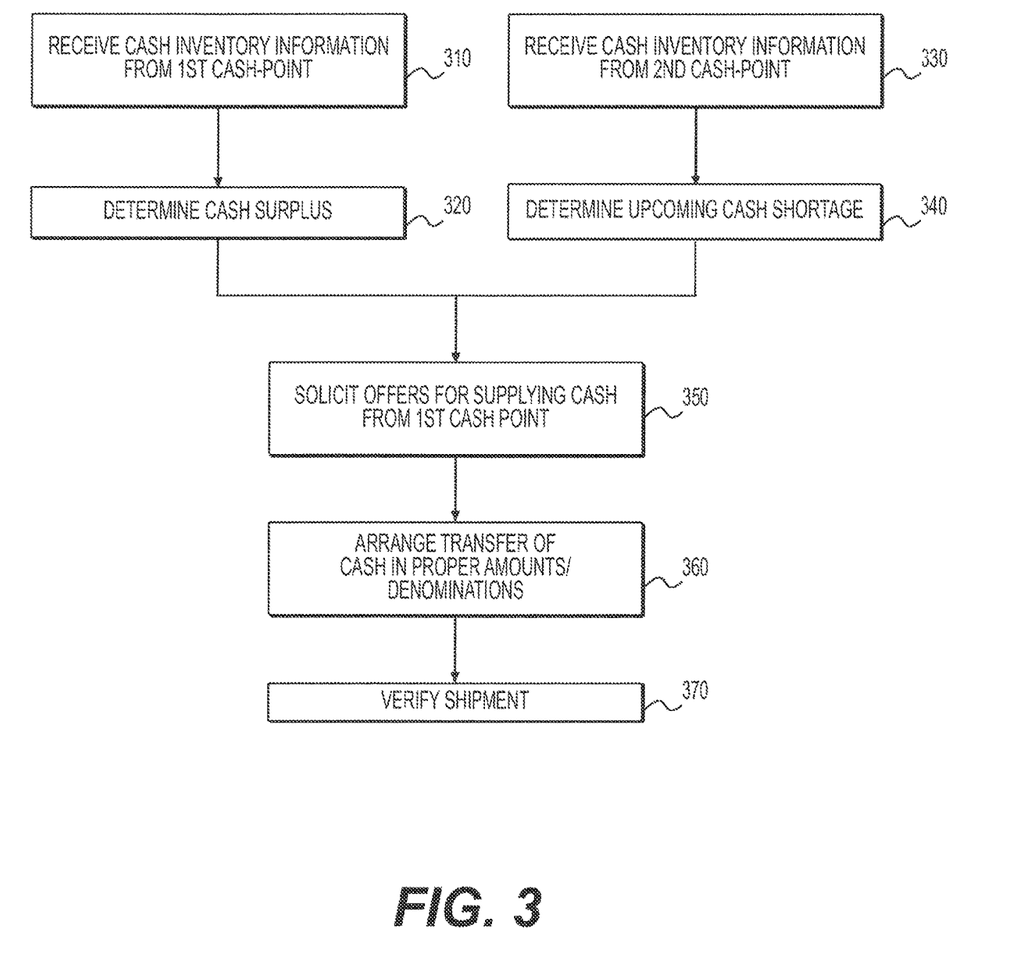
FIG. 3 illustrates a flow chart of a method for facilitating transfer of cash inventories between entities in accordance with a particular non-limiting embodiment of the present disclosure.

With reference to FIG. 3, a method for facilitating transfer of cash inventories between entities is illustrated in accordance with yet another non-limiting embodiment of the present disclosure. The system of FIG. 3 combines aspects of cash demand forecasting and the cash supply network for heterogeneous entities to create an automatic system for scheduling cash deliveries between entities to prevent shortages of currency and reward those with excess cash reserves. At step 310, cash inventory information is received from a first cash-point and at step 330 cash inventory information is received from a second cash-point. At step 320, a cash surplus is detected at the first cash-point, while at step 340, an upcoming cash shortfall is detected at the second cash-point. Historical cash demand information is suitable for predicting surpluses and shortfalls at each location. In certain embodiments, the historical demand data is generated by currency processing machines which are capable of transmitting or storing information regarding transaction. In particular embodiments, a third party system maintains transaction and payment information. Data from these systems can be aggregated to create baselines and detect trends in cash utilization. Applying various forecasting analysis methods to this data can be used to predict cash shortages and surpluses in various retail stores.

Centralization and offering such a product as a service allows small companies or companies that would otherwise be ill-equipped to collect and manage such information with an opportunity to increase cash-flow or decrease logistical planning by participating in a cash supply network. An additional benefit of participation in such a network is cash inventory management and forecasting. In certain embodiments, cash-points choose not to participate as a supplier or requestor in such a network, but instead benefit from the information collected by such a network. For example, this information is helpful in forecasting regional cash demand. This information can then be used by the participant to better plan its business.

At step 350, offers are solicited from cash supply network participants as described above. Entities are matched to optimize certain shipment criteria such as speed, cost, distance, or the like. In certain embodiments, cash processing machines or smart-safes are capable of automatically bundling cash in preparation for shipments. In one example, the smart-safe directs an employee to the proper areas of a vault for collecting currency of a certain quality. The cash processing machine can be configured to interact with the clearing house to automatically page employees when a new shipment request is received and direct the employee as to the requirements for the shipment.

At step 370, a currency processing device verifies the shipment of currency. In certain embodiments, each shipment is sent to a field office for manual verification by the clearing house. However, remote processing agents may be more efficient. In certain embodiments, no agents are used in verification. Rather, the supplier and recipient may agree in person to accept the cash transferred. The acceptance is recorded with the clearing house and the payment is processed from the recipient to the shipper.

Figure 4:
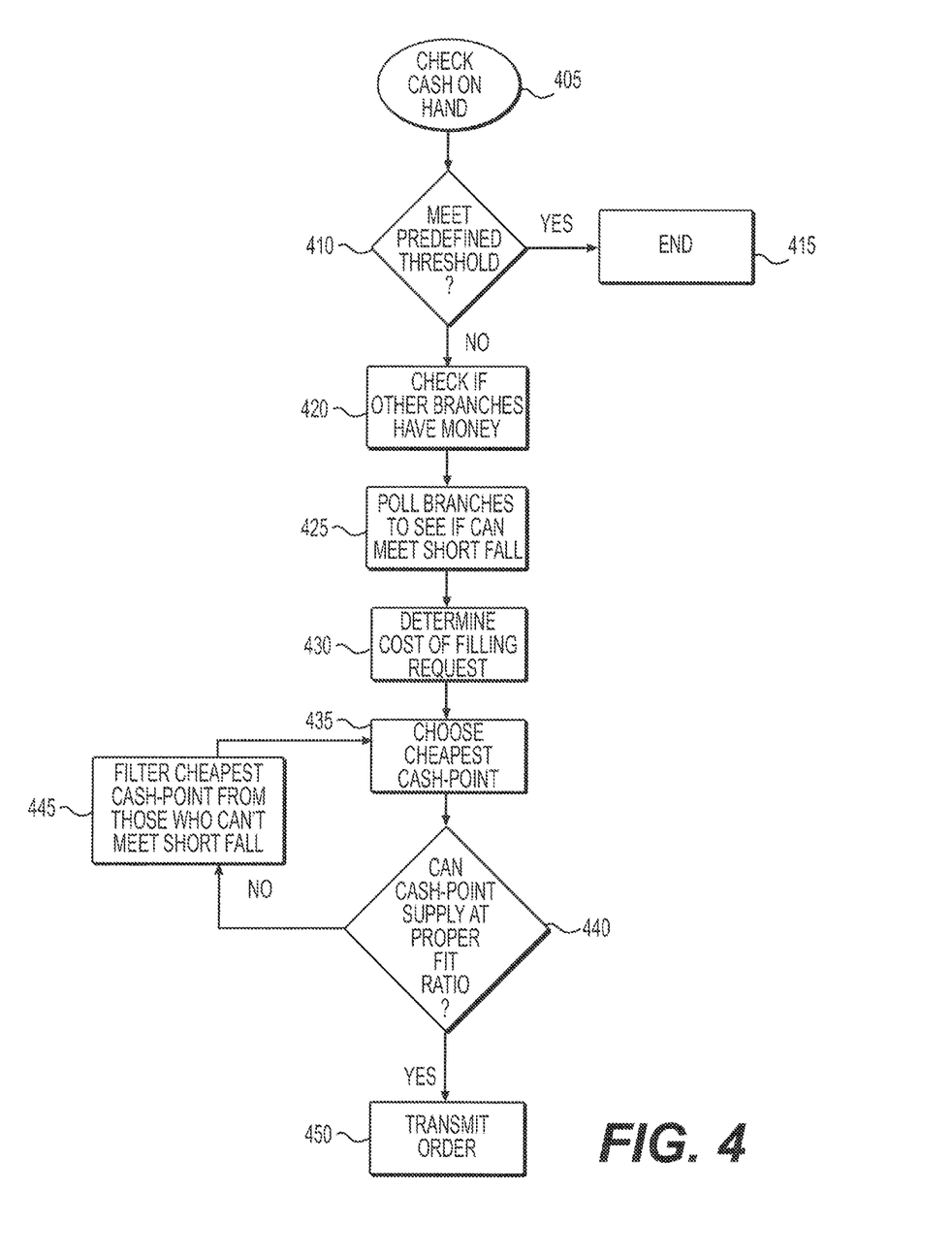
FIG. 4 illustrates a flow chart of a method for facilitating transfer of cash inventories between entities in accordance with a particular non-limiting embodiment of the present disclosure.

With reference to FIG. 4, a method 400 for facilitating transfer of cash inventories between entities is illustrated in accordance with yet another non-limiting embodiment of the present disclosure. The exemplary method of FIG. 4 details the process for determining suitable currency fitness levels at cash-points and determining suitable cash-points for accommodating transfer requests.

In certain embodiments, initiating the transfer process includes submitting a transfer request to a branch, which chooses to accept or reject the transfer request. A central office associated with a cash-point may offer incentives to the cash-points (i.e., branch managers or ATM managers) in exchange for preparing and fulfilling transfer requests.

In certain systems, currency condition is tracked and managed with reference to a serial number embedded on a banknote, while information regarding the total number and denomination of banknotes at various locations is aggregated for analysis by managers. Defective or anomalous banknotes can be flagged and tracked, for eventual removal or replacement.

The teachings of the present disclosure present a cash and vault management super system that can be used to autonomously resolve and handle a range of objectives and tasks within the cash management lifecycle. In certain embodiments, historical currency monitoring data is used to simulate, test, and validate cash transfer, delivery, and/or production operations of a financial organization. Information may be presented in a variety of graphical representations, including a hierarchical geography-based view of a financial organization.

Some banknote processing equipment contains a number of sensors that capture different types of banknote features during processing. In some applications, the information captured is used in real-time to determine the fate of the note (e.g., recycling, destruction or reject) and only summary data are captured from the sensors for use off-line.

Improvements in both data communications and data storage allow more information to be extracted from each note processed (for example, image, serial number, sensor results, and the like). A complete data profile for each note processed potentially creates a huge amount of data (terabytes/hour), perhaps more than a high-resolution video camera that uses data compression to reduce the redundant data in each frame. But for banknote reconciliation, compression is not required if each note is considered unique.

The sensors used for processing banknotes perform a variety of functions. For example, an image sensor may examine a note under various wavelengths of light, looking for the presence/absence of visual features and other complex tasks. The output of an image sensor can be as much as 10 MB (or more) per note, for example. A banknote processing machine makes use of the various sensor outputs using one (or more) pre-determined formulas that can be "fine-tuned" according to the circumstances. For example, the destruction of "soiled" notes can be determined according to the "clean money" policy of the Central Bank. Because each shredded note is then replaced with a newly printed banknote, the economics of banknote destruction play a role in each country. But in summary, as the data captured (or potentially captured) by the sensor "suite" has increased, technology make it feasible to capture an expanded set of data for every banknote processed.

Bank central offices can collect serial number information capture via Banknote Processing Equipment. Serial number capture has been available for most currencies in high-speed equipment for some years now. Serial numbers are used to determine banknote age, origin (and distance from origin), frequency of processing (for example, tracking the number of times the same bill has been processed), etc. Serial numbers are also captured for notes destroyed so that if a banknote re-appears with the same number, an investigation as to authenticity/counterfeit can be requested.

The capture and storage of individual banknote sensor information is helpful in banknote processing and, more specifically, in the handling and management of rejects. Each banknote, by definition, is unique. This is at least coming from a unique serial number, but because each note has traveled a different route to its ultimate inclusion in a deposit being processed, there will be subtle differences among the notes.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations or block diagrams, may be implemented by computer program instructions, for example. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the function(s) specified in the flowcharts or block diagram block(s).

These computer program instructions can also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function(s) specified in the flowchart or block diagram block(s). The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the function(s) specified in the flowcharts or block diagram block(s). For example, wireless devices described herein are examples of such programmable data processing apparatuses.

Aspects of the present disclosure may be implemented by various combinations of apparatuses, devices, systems, or components thereof, for example. Reference in the appended claims to an apparatus, device, or system or a component thereof being configured to or operable to perform a particular function encompasses that apparatus, system, component, or device, whether such apparatus, system, component, or device or such particular function is activated, turned on, or unlocked, as long as that apparatus, system, or component is so configured or operable.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A method comprising:
receiving currency inventory information from a plurality of cash-points, the currency inventory information is received from a currency processing agent at each of the plurality of cash-points;
receiving a currency shipment request from a first cash-point;
determining at least one eligible cash-point from the plurality of cash-points based on the currency inventory information, each eligible cash-point being associated with a respective currency inventory having sufficient currency reserves to fulfill the currency shipment request;
receiving an offer from each eligible cash-point, each offer indicative of an asking price for fulfilling the currency shipment request;
determining a selected cash-point to fulfill the currency shipment request based on the offers received from the at least one eligible cash-point; and
initiating shipment of currency from the selected cash-point to the first cash-point,
wherein each currency processing agent is configured to analyze banknote fitness quality information of each of a plurality of banknotes in the respective currency inventory for the cash-point to evaluate whether such banknotes meet a first threshold banknote fitness criteria corresponding to use in an Automated Teller Machine or a second threshold banknote fitness criteria corresponding to use in a retail location,
wherein the currency shipment request further comprises:
a time requirement, and
a request for banknotes corresponding to one of the first threshold banknote fitness criteria and the second threshold banknote fitness criteria, and
wherein determining the at least one eligible cash-point is further based on whether:
each of the plurality of cash-points is able to fulfill the shipment request within the time requirement, and
a sufficient number of banknotes in the respective currency inventory for each of the plurality of cash-points meets the first threshold banknote fitness criteria or the second threshold banknote fitness criteria, wherein:
when the request corresponds to banknotes corresponding to the first threshold banknote fitness criteria, whether a sufficient number of banknotes in the respective currency inventory for each of the plurality of cash-points meets the first threshold banknote fitness criteria, and
when the request corresponds to banknotes corresponding to the second threshold banknote fitness criteria, whether a sufficient number of banknotes in the respective currency inventory for each of the plurality of cash-points meets either the first threshold banknote fitness criteria or the second threshold banknote fitness criteria.

2. The method of claim 1, further comprising:
determining, for each eligible cash-point, a shipment mechanism for transporting currency from the respective currency inventory to the first cash-point, wherein the selected cash-point is further determined based on each shipment mechanism.

3. The method of claim 1, wherein the first cash-point is a retail location associated with a first organization, and the selected cash-point is associated with a second organization, unaffiliated with the first organization.

4. The method of claim 1, wherein the currency inventory information is received from the currency processing agent including a banknote processing device configured to analyze each banknote in each respective currency inventory for information selected from the group comprising:
denomination;
soil level;
serial number; and
authenticity,
wherein the currency processing agent is configured to analyze banknote fitness quality information based at least on soil level information analyzed by the banknote processing device.

5. A cash transfer facilitating computer configured to access a storage device, the cash transfer facilitating computer comprising:
at least one processor; and
a non-transitory, computer-readable storage medium storing computer-readable instructions that when executed by the processor cause the computer to perform:
receiving currency inventory information from a plurality of cash-points; receiving a currency shipment request from a first cash-point in the plurality of cash-points, the currency inventory information is received from a currency processing agent at each of the plurality of cash-points;
determining at least one eligible cash-point from the plurality of cash-points based on the currency inventory information, each eligible cash-point being associated with a respective currency inventory having sufficient currency reserves to fulfill the currency shipment request;
receiving an offer from each eligible cash-point, each offer indicative of an asking price for fulfilling the currency shipment request;
determining a selected cash-point to fulfill the currency shipment request based on the offers received from the at least one eligible cash-point; and
initiating shipment of currency from the selected cash-point to the first cash-point,
wherein each currency processing agent is configured to analyze banknote fitness quality information of each of a plurality of banknotes in the respective currency inventory for the cash-point to evaluate whether such banknotes meet a first threshold banknote fitness criteria corresponding to use in an Automated Teller Machine or a second threshold banknote fitness criteria corresponding to use in a retail location,
wherein the currency shipment request further comprises:
a time requirement, and
a request for banknotes corresponding to one of the first threshold banknote fitness criteria and the second threshold banknote fitness criteria, and
wherein determining the at least one eligible cash-point is further based on whether:
each of the plurality of cash-points is able to fulfill the shipment request within the time requirement, and
a sufficient number of banknotes in the respective currency inventory for each of the plurality of cash-points meets the first threshold banknote fitness criteria or the second threshold banknote fitness criteria, wherein:
when the request corresponds to banknotes corresponding to the first threshold banknote fitness criteria, whether a sufficient number of banknotes in the respective currency inventory for each of the plurality of cash-points meets the first threshold banknote fitness criteria, and
when the request corresponds to banknotes corresponding to the second threshold banknote fitness criteria, whether a sufficient number of banknotes in the respective currency inventory for each of the plurality of cash-points meets either the first threshold banknote fitness criteria or the second threshold banknote fitness criteria.

6. The cash transfer facilitating computer of claim 5, wherein the computer-readable instructions further cause the computer to perform:
determining, for each eligible cash-point, a shipment mechanism for transporting currency from the respective currency inventory to the first cash-point, wherein the selected cash-point is further determined based on each shipment mechanism.

7. The cash transfer facilitating computer of claim 5, wherein the first cash-point is a retail location associated with a first organization, and the selected cash-point is associated with a second organization, unaffiliated with the first organization.

8. The cash transfer facilitating computer of claim 5, wherein the currency inventory information is received from the currency processing agent including a banknote processing device configured to analyze each banknote in each respective currency inventory for information from the group comprising:
denomination;
soil level;
serial number; and
authenticity,
wherein the currency processing agent is configured to analyze banknote fitness quality information based at least on soil level information analyzed by the banknote processing device.

9. A computer program product facilitating transfer of cash inventory, the computer program product comprising:
a non-transitory computer-readable storage medium having computer-readable program code embodied therewith, the computer-readable program code comprising:
computer-readable program code configured to receive currency inventory information from a plurality of cash-points, the currency inventory information is received from a currency processing agent at each of the plurality of cash-points;
computer-readable program code configured to receive a currency shipment request from a first cash-point in the plurality of cash-points;
computer-readable program code configured to determine at least one eligible cash-point from the plurality of cash-points based on the currency inventory information, each eligible cash-point being associated with a respective currency inventory having sufficient currency reserves to fulfill the currency shipment request;
computer-readable program code configured to receive an offer from each eligible cash-point, each offer indicative of an asking price for fulfilling the currency shipment request;
computer-readable program code configured to determine a selected cash-point to fulfill the currency shipment request based on the offers received from the at least one eligible cash-point; and
computer-readable program code configured to initiate shipment of currency from the selected cash-point to the first cash-point,
wherein each currency processing agent is configured to analyze banknote fitness quality information of each of a plurality of banknotes in the respective currency inventory for the cash-point to evaluate whether such banknotes meet a first threshold banknote fitness criteria corresponding to use in an Automated Teller Machine or a second threshold banknote fitness criteria corresponding to use in a retail location,
wherein the currency shipment request further comprises:
a time requirement, and
a request for banknotes corresponding to one of the first threshold banknote fitness criteria and the second threshold banknote fitness criteria, and
wherein determining the at least one eligible cash-point is further based on whether:
each of the plurality of cash-points is able to fulfill the shipment request within the time requirement, and
a sufficient number of banknotes in the respective currency inventory for each of the plurality of cash-points meets the first threshold banknote fitness criteria or the second threshold banknote fitness criteria, wherein:
when the request corresponds to banknotes corresponding to the first threshold banknote fitness criteria, whether a sufficient number of banknotes in the respective currency inventory for each of the plurality of cash-points meets the first threshold banknote fitness criteria, and
when the request corresponds to banknotes corresponding to the second threshold banknote fitness criteria, whether a sufficient number of banknotes in the respective currency inventory for each of the plurality of cash-points meets either the first threshold banknote fitness criteria or the second threshold banknote fitness criteria.

10. The computer program product of claim 9, wherein the computer-readable storage medium further comprises:
computer-readable program code configured to determine, for each eligible cash-point, a shipment mechanism for transporting currency from the respective currency inventory to the first cash-point, wherein the selected cash-point is further determined based on each shipment mechanism.

11. The computer program product of claim 9, wherein the first cash-point is a retail location associated with a first organization, and the selected cash-point is associated with a second organization, unaffiliated with the first organization.

12. The computer program product of claim 9, wherein the currency inventory information is received from the currency processing agent including a banknote processing device configured to analyze each banknote in each respective currency inventory for information from the group comprising:
denomination;
soil level;
serial number; and
authenticity, wherein the currency processing agent is configured to analyze banknote fitness quality information based at least on soil level information analyzed by the banknote processing device.

* * * * *